US012718234B2

(12) United States Patent
Palm et al.

(10) Patent No.: US 12,718,234 B2
(45) Date of Patent: Aug. 25, 2026

(54) DATA OBJECT COMPRESSION AND REDUCTION

(71) Applicant: Chicago Mercantile Exchange Inc., Chicago, IL (US)

(72) Inventors: Peter Mattias Palm, Stockholm (SE); Jesper Lars Wilhelm Hermodsson, Bromma (SE); Sven Marcus Dahlin, Hägersten (SE); Carl Erik Thornberg, Stockholm (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/432,888

(22) Filed: Feb. 5, 2024

(65) Prior Publication Data

US 2024/0177152 A1 May 30, 2024

Related U.S. Application Data

(63) Continuation of application No. 16/938,307, filed on Jul. 24, 2020, now Pat. No. 11,922,412.

(60) Provisional application No. 62/950,909, filed on Dec. 19, 2019.

(51) Int. Cl.
*G06Q 40/00* (2023.01)
*G06Q 20/38* (2012.01)

(52) U.S. Cl.
CPC ......... *G06Q 20/389* (2013.01); *G06Q 20/381* (2013.01)

(58) Field of Classification Search
CPC ........................... G06Q 20/389; G06Q 20/381
See application file for complete search history.

(56) References Cited

U.S. PATENT DOCUMENTS 5,761,386 A 6/1998 Lawrence et al.
7,689,630 B1 3/2010 Lam
9,667,751 B2 * 5/2017 Fallon .................... G06T 9/005
10,803,456 B1 * 10/2020 Thornberg ........... G06Q 20/389
(Continued)

FOREIGN PATENT DOCUMENTS

WO WO-2008123885 A1 * 10/2008 ............. G06Q 40/00
WO 2010000487 A1 1/2010

OTHER PUBLICATIONS

Ma et al: "Bank Big Data Architecture based on Massive Parallel Processing Database", 2018 15th International Symposium on Pervasive Systems, Algorithms and Networks, (I-SPAN) (2018, pp. 93-99). (Year: 2018).*

(Continued)

*Primary Examiner* — Edward J Baird
(74) *Attorney, Agent, or Firm* — Lempia Summerfield Katz LLC

(57) ABSTRACT

A system is configured to implement data compression on a set of data objects. The system includes a processor configured to obtain the set of data objects. The data objects specify, source, type, size, and polarity data for a plurality of transactions. The processor is configured to implement an optimization procedure based on constraint data associated with the sources for the data object. The optimization procedure reduces aggregate size data for the set of data objects via operation on at least a subset of the data objects, the subset associate with a particular data source.

20 Claims, 7 Drawing Sheets

(56) References Cited

U.S. PATENT DOCUMENTS

2002/0156737 A1* 10/2002 Kahn .................. G06F 21/6218 705/51
2003/0120747 A1 6/2003 Kim
2008/0165783 A1* 7/2008 Desanti ................... H04L 63/06 370/465
2008/0281984 A1 11/2008 Roberts
2010/0317420 A1* 12/2010 Hoffberg ............ G06Q 30/0282 463/1
2010/0332373 A1* 12/2010 Crabtree ................ G06Q 40/04 709/224
2012/0047062 A1* 2/2012 Robinson ............... G06Q 40/00 705/37
2013/0346274 A1* 12/2013 Ferdinand .............. G06Q 40/04 705/37
2015/0326694 A1* 11/2015 Westberg ................ H04L 65/80 709/203
2016/0078510 A1* 3/2016 Gadre ................ G06Q 30/0611 705/26.4
2016/0125399 A1* 5/2016 Burnham ............... G06Q 40/04 705/37
2016/0253635 A1 9/2016 Marquardt et al.
2016/0260169 A1* 9/2016 Arnold ................. G06Q 20/381
2017/0148264 A1 5/2017 Pichette et al.
2017/0371879 A1 12/2017 Jang

OTHER PUBLICATIONS

Examination Report from European Patent Application No. 20 214 954.8, dated Aug. 28, 2023, 8 pages.

Extended European Search Report in European Patent Application No. 20 21 4954, dated Mar. 9, 2021, 9 pages.

Jayawardena et al: "Improved Algorithm for Cleaning High Frequency Data: an Analysis of Foreign Currency", Corporate Ownership & Control/vol. 12, Issue 3, 2015 (Year: 2015).

Laughlin, Gregory, Anthony Aguirre, and Joseph Grundfest. "Information transmission between financial markets in Chicago and New York". Financial Review 49.2 (2014): 283-3 12. (Year: 2014).

Examination Report from European Patent Application No. 20214954.8, dated Aug. 28, 2024, 5 pages.

* cited by examiner 200 (134)

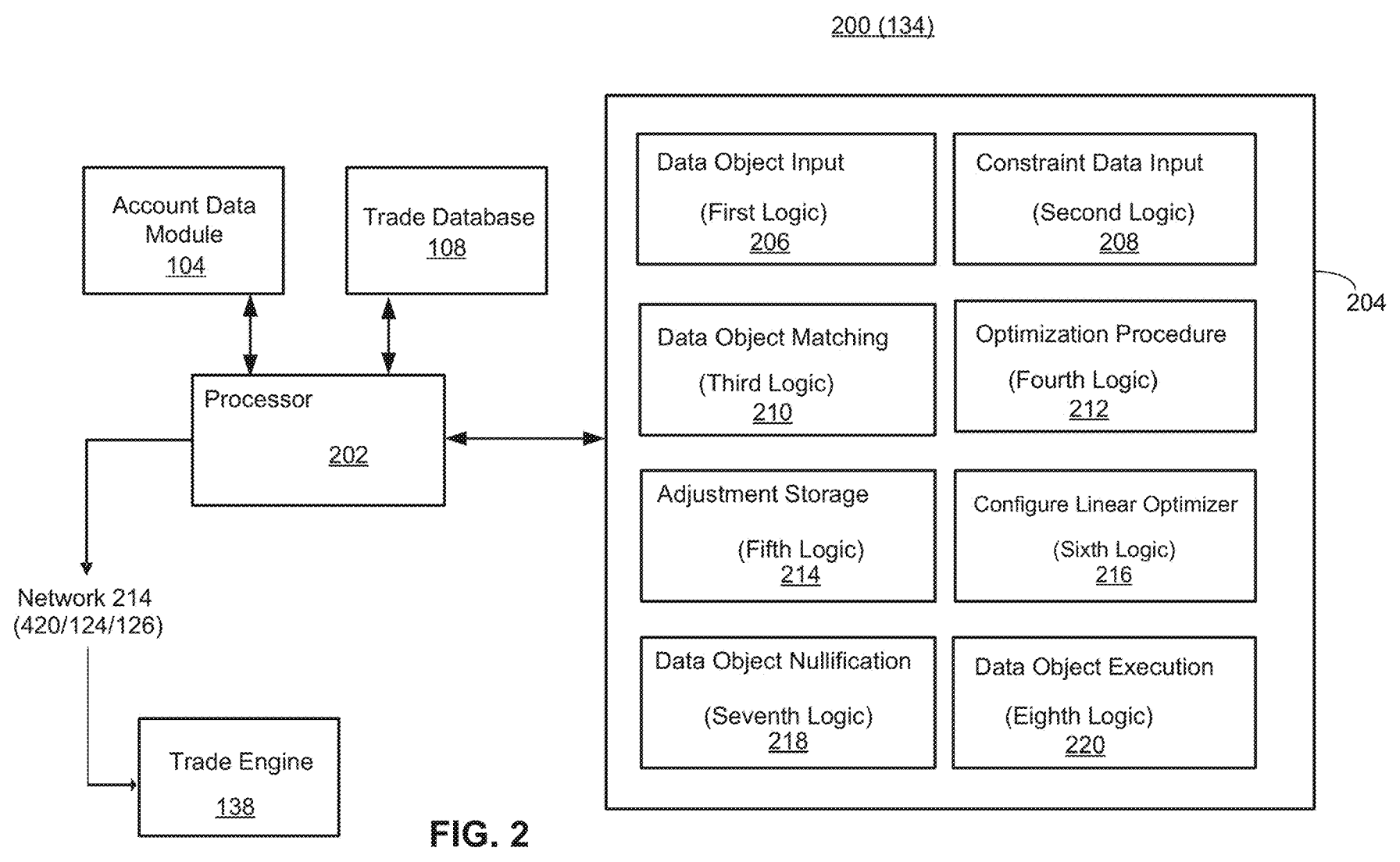

204

Data Object Input (First Logic) 206

Constraint Data Input (Second Logic) 208

Data Object Matching (Third Logic) 210

Optimization Procedure (Fourth Logic) 212

Adjustment Storage (Fifth Logic) 214

Configure Linear Optimizer (Sixth Logic) 216

Data Object Nullification (Seventh Logic) 218

Data Object Execution (Eighth Logic) 220

Trade Database 108

Account Data Module 104

Processor 202

Network 214 (420/124/126)

Trade Engine 138

FIG. 2

Combined process

Account A

| | B | C |
|---|---|---|
| Total net | 0 | 0 |
| Transaction net | 0 | 100 |
| Transaction gross | 0 | 100 |

100

Account C

| | A | D |
|---|---|---|
| Total net | 0 | 0 |
| Transaction net | -100 | 0 |
| Transaction gross | 100 | 0 |

Account B

| | A | D | E |
|---|---|---|---|
| Total net | N/A | N/A | N/A |
| Transaction net | 0 | 0 | 0 |
| Transaction gross | 0 | 0 | 0 |

Account D

| | B | C | E |
|---|---|---|---|
| Total net | N/A | N/A | N/A |
| Transaction net | 0 | 0 | 0 |
| Transaction gross | 0 | 0 | 0 |

Account E

| | B | D |
|---|---|---|
| Total net | N/A | N/A |
| Transaction net | 0 | 0 |
| Transaction gross | 0 | 0 |

FIG. 6

DATA OBJECT COMPRESSION AND REDUCTION

CROSS-REFERENCE TO RELATED APPLICATION

This application claims priority to and is a continuation of U.S. patent application Ser. No. 16/938,307, filed Jul. 24, 2020, now U.S. Pat. No. 11,922,412 and titled Data Object Compression and Reduction, which claims the benefit of the filing date under 35 U.S.C. § 119 (e) of U.S. Provisional Application Ser. No. 62/950,909, filed Dec. 19, 2019, the entire disclosures of which are hereby incorporated by reference and relied upon.

BACKGROUND

While costs associated with computers and memory storage products have been falling with technological improvements, available computing resources remain at a premium. For example, the processing of electronic communications has led to substantial increases in necessary memory usage and computing processing power. In many cases, computing centers tasked with implementing and maintaining these electronic communications are constrained by existing or aging hardware and software resources, and budgetary concerns regarding the purchase, upgrade, or repair of the hardware and software infrastructure components.

With the ever-increasing amount of data being processed, computing resources, such as memory and/or other storage, may be depleted and additional resources may need to be added to the system. Additionally, the data stored may be communicated between computing systems for processing. These communication requirements may result in slowed communications capability, as communication bandwidth on an organization's network may be a finite, limited resource.

For these and other reasons, improvements to data management capabilities, including intelligent compression of data, are warranted. The compression should be intelligent in the sense that the compression only removes data that is redundant or otherwise indicative of unnecessary information. In that way, data indicative of information of value is maintained despite the data compression.

BRIEF DESCRIPTION OF THE DRAWINGS

FIG. 2 is a block diagram of a system for data object compression and reduction via multi-purpose optimization in accordance with one example involving, in some cases, trade-based data objects.

FIG. 6 depicts an implementation of a multi-purpose optimization for data object compression and reduction for the number of account data sources depicted in FIG. 5 in accordance with one example.

DETAILED DESCRIPTION

Figure 1:
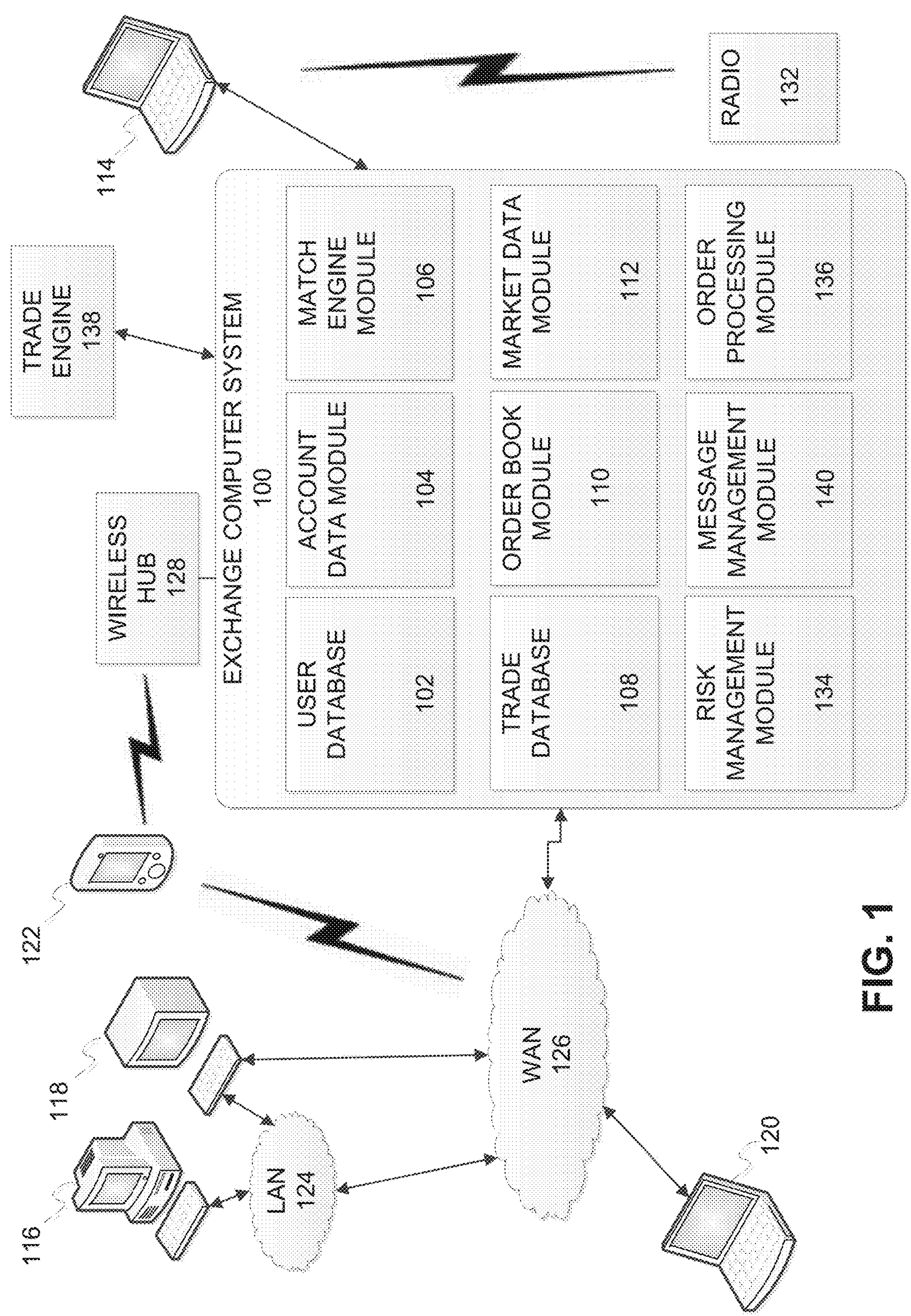
FIG. 1 depicts an illustrative computer network system that may be used to implement aspects of the disclosed embodiments.

Systems and methods for data object compression and reduction via multi-purpose optimization are described. The multi-purpose optimization of the disclosed systems and methods is directed to effectuating one or more adjustments to a set of data objects in a manner that reduces multiple sizes or other magnitudes associated with the set of data objects. One magnitude may be an aggregate magnitude for the entire data set. Other magnitudes may be composite magnitudes for data objects linked to respective pairs of data sources. The disclosed systems and methods may be configured to find the optimal adjustments to the set of data objects that maximizes the reductions to these sizes or magnitudes.

The multi-purpose aspect of the optimization of the disclosed methods and systems may provide additional degrees of freedom for the optimization. As described below, the additional degrees of freedom may be provided by including data objects from data sources interested in different purposes for the optimization. For example, the data sources may not be limited to those that benefit from compression of a data set gross magnitude, or to those that benefit from a reduction in data link composite magnitudes. Instead, both types of data sources, as well as data sources interested in both compression or reduction, may be included. The number of data objects in the set accordingly increases. The increase in data objects, in turn, effectively provides additional opportunities for adjustments in the optimization. A greater amount of compression and reduction may therefore be achieved.

The optimization determines which data objects are suitable for termination, reduction, or other nullification or modification (e.g., increasing a magnitude). As described below, data objects are reduced or nullified by offsetting data objects of the same type and opposite polarity. The optimization may thus be configured to ensure that the net position or information presented by the data objects may thus remain unchanged, or only change within a predetermined or specified tolerance level. In some cases, the optimization may alternatively or additionally incorporate new data objects into the set. Such new data objects are created and incorporated when the optimization recognizes that the effective result is further compression or reduction.

These and other aspects of the disclosed methods and systems present technical solutions to the technical problems presented by the processing of sets of data objects. For instance, one technical problem involves data object sets that are excessively large. The size of the data object set presents storage and other processing requirements and challenges. However, indiscriminate deletion of data objects to reduce the size of the data object set is not possible, insofar as information will be lost. Therefore, the technical problem also involves finding an intelligent way to reduce the size of the data object set. The disclosed methods and systems provide an intelligent procedure for reducing the size (and/or other size-related parameters) of the data object set to provide solutions to such storage and processing challenges without incurring detrimental information loss. Yet another technical benefit provided by the disclosed methods and systems involves a reduction in communications or other data transmissions regarding the data object set. With a smaller data object set, network traffic and network processing loads therefore decrease. Still other technical problems addressed by the disclosed methods and systems involve the size or amount of data objects linked between data sources. Indiscriminate deletion of data to reduce a data link size is also not possible. Nonetheless, reducing the data link size provides similar benefits in processing, memory, and communication loads of the data sources and other entities involved in handling the linked data objects.

The disclosed methods and systems may be implemented in connection with gross notional and other compression procedures involving data objects representative of financial positions. Each financial position is created by a trade or transaction, such as a foreign currency exchange transaction (e.g., a Forex, or FX, trade). In Forex cases, each trade creates two positions, one for each party to the trade. Each market participant may have a portfolio of such positions. The portfolios of a number of parties may then be aggregated to establish the data object set. Despite being described in connection with FX examples, the disclosed methods and systems are well suited for use in connection with other types of financial transactions, such as other over-the-counter (OTC) products, as well as other types of data objects. In some cases, the disclosed methods and systems are useful in connection with financial transactions involving interest rates (e.g., interest rate swaps, equity contracts, and credit contracts. In still other cases, the disclosed methods and systems may be useful in connection with OTC commodities contracts, in which transaction records are reduced through multilateral compression along with reduction of the number of counterparties with which a participant needs to settle physical transactions.

Data object compression and reduction in the financial context involves each party (e.g., a bank or other market participant) attempting to lower the size of its portfolio by offsetting positions against one another while remaining risk neutral or within a specified risk tolerance level. The offsetting allows positions to be terminated or reduced in size, e.g., by lowering the notional amount of the position. Offsetting the positions thus lowers the gross notional amount of a portfolio. The portfolio compression thus lowers the costs incurred as a function of the gross notional amount of a portfolio, while maintaining the market position (s) of a party, i.e., compression without information loss.

Data link size reduction in the financial context involves bilateral risk reduction. Bilateral risk relates to the risk of a specific counterparty becoming insolvent, or unable to cover its losses incurred in trades. A party having too many positions in its portfolio with a specific counterparty may deem that bilateral or counterparty risk too high. The party may also be charged higher fees as a result of such bilateral risk. Reduction of such risk has typically involved adding one or more new transactions between the two parties to reduce the composite bilateral amount for each counterparty. The new transactions have been added in accordance with risk constraints that specify the degree to which a party's market position(s) and/or other risk parameters (e.g., bucketed interest, delta, etc.) may deviate from a risk neutral adjustment.

The disclosed methods and systems achieve both greater gross notional (and/or other data object set compression) and greater bilateral reduction (and/or other data link reduction) by addressing the compression and reduction tasks in combination rather than separately. The disclosed methods and systems may thus support parties (or other data sources) interested in data object set compression only, data link reduction only, or a combination of both data object set compression and data link reduction.

The compression and reduction tasks are provided in combination by a multi-purpose optimization. For instance, the multi-purpose optimization weighs the effects of adding or removing transactions (or other data objects) to reduce data link composite magnitudes (e.g., reduce bilateral or counterparty risk) against the effects of adding and removing transactions (or other data objects) to reduce a data set aggregate magnitude(s) (e.g., compress gross notional amounts), as described herein.

Addressing the interests of all such parties in combination (e.g., in a common process) increases the efficiency and effectiveness of the compression and risk reduction. For instance, efficiency is increased because addressing data set compression and data link reduction separately would involve processes that work against one another. A data set compression process would result in removing transactions (or other data objects). A data link reduction process would result in adding transactions (or other data objects), which increases data set size. Repeating either process may thus result in cycling between addition and removal. Effectiveness is also improved because the combination presents additional degrees of freedom for the optimization. Greater amounts of compression and risk reduction are accordingly achieved.

The compression and bilateral risk reduction may be provided in a manner that is risk neutral for a central or other controlling party, such as a clearinghouse (e.g., central counterparty clearinghouse, or CCP) or exchange. Keeping the CCP risk neutral is thus another constraint on the optimization implemented by the disclosed methods and systems. In some cases, e.g., when the CCP is not one of the parties involved in the transaction, the optimization is not constrained in this manner.

In some cases, the compression provided by the disclosed methods and systems may be initiated and otherwise implemented automatically. For example, the disclosed methods and systems may be configured to automatically process a set of data objects upon the detection of a trigger event or condition, such as a set of data objects exceeding a data size threshold. Alternatively or additionally, the disclosed methods and systems may be configured to automatically evaluate sets of data objects for compression, e.g., on a periodic or regular basis.

A financial instrument trading system, such as a futures exchange, referred to herein also as an "exchange", such as the Chicago Mercantile Exchange Inc. (CME), provides a contract market where financial instruments are traded. Typically, the exchange provides for a centralized "clearinghouse" through which all trades made must be confirmed, matched, and settled each day until offset or delivered. The clearinghouse is an adjunct to the exchange, and may be an operating division of the exchange, which is responsible for settling trading accounts, clearing trades, collecting and maintaining performance bond funds, regulating delivery, and reporting trading data. One role of the clearinghouse is to mitigate credit risk. Clearing is the procedure through which the clearinghouse becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearinghouse.

The foreign exchange (FX) currency market is a over-the-counter (OTC) global market allowing market participants to buy, sell, trade and otherwise speculate on for the trading of currencies and may be considered to be one of the largest, and most liquid, financial markets in the world. On the FX currency market, currencies are typically traded in pairs, such as a U.S. dollar/Japanese yen pair (USD/JPY) a Euro/U.S. dollar pair (EUR/USD), and the like. In some cases, FX forwards products may be referenced as currency pairs against the U.S. dollar, such as Euros vs. U.S. dollars (EUR/USD), U.S. dollars vs. Japanese yen (USD/JPY), British pounds vs. U.S. dollars (GBP/USD), U.S. dollars vs. Swiss francs (USD/CHF), U.S. dollars vs. Canadian dollars (USD/CAD), Australian dollars vs. USD (AUD/USD), U.S. dollars vs. Mexican pesos (USD/MXN), New Zealand dollars vs. USD (NZD/USD), U.S. dollars vs. Russian ruble (USD/RUB), U.S. dollars vs. South African rand (USD/ZAR), U.S. dollars vs. Brazilian real (USD/BRL), U.S. dollars vs. Chinese Renminbi (USD/RMB), U.S. dollars vs. Korean won (USD/KRW), and many others.

In the OTC foreign exchange (FX) marketplace, there are several products that are traded. Illustrative examples of these products may include physically settled FX Forwards, OTC FX Cash Settled Forwards (CSFs), OTC FX Non-Deliverable Forwards (NDFs), and the like. In CSFs products, the associated currency pair corresponds to two currencies that are deliverable such as the EUR/USD currency pair. An exposure for the CSF is calculated in reference to a single currency of choice and the value moves accordingly. In NDF products, the associated currency pair includes one currency that is deliverable whereas the other currency is non-deliverable such as USD/BRL. Here, the exposure may be calculated and move in reference to the deliverable currency. In the illustrative USD/BRL example, the exposure will move in USD.

When entering either of these trades, an initial "Trade Price" is agreed upon by both participants and a value date at which the exposure will be exchanged. Rules specify how the exposure will be calculated using an agreed upon source for a "Fixing Price" on the "fixing date" and the difference between the Fixing Price and Trade Price. In some cases, the Trade Price and the Fixing Price may be referenced in terms of an exchange rate between the two currencies, such that both the Trade Price and the Fixing Price may be calculated using the exchange rate on the trade date (e.g., a Trade Exchange Rate") and the termination date (e.g., a "Fixing Exchange Rate"), respectively. As markets move, the Trade Price, and/or the Trade Exchange Rate, may be different at different times for the same fixing date. If a counterparty is facing a single counterparty such a central counterparty but has various trades with identical terms but a different Trade Price, then all of these trades will be open line items in their respective portfolios. As such, financial institutions, such as a financial exchange, a bank, an investment broker, etc. may face an increased need for data storage and/or computing capacity to manage one or more of these large portfolios.

Market participants may desire to enter into one or more FX forwards in an OTC market to reduce risk associated with exposure to one or more currencies. For example, an organization may use FX forwards as a hedging tool that does not require any upfront payment from either party to the transaction. For example, a business organization may sell goods in a foreign market and may expect to receive the proceeds of the sale at some future date. Because the future sales may be subject to risk and/or other uncertainty based on the fluctuating exchange rates, the business organization may decide to enter one or more FX forwards transactions to hedge the risk associated with the fluctuating currency markets and/or the uncertainty associated with an expected profit due to the predicted exchange rate at the future date. For example, the business organization may sell product in a foreign market over a specified timeframe but, for a variety of reasons, the business organization may not receive the proceeds of the sale until some future date after the timeframe of the sale. For example, the business organization may sell product during the first quarter of the year, but not receive the proceeds of the sale(s) until a future date, such as a date in the fourth quarter of the year. Due to the fluctuations in the currency market, the organization may desire to hedge any potential lost profit due to an unfavorable exchange rate in the future. By hedging these risks, the parties to the FX forwards may have a goal to allow their assets and/or liabilities to at least remain near the starting levels and/or minimize any losses.

Generally, the currently available exchange rate dictates the costs associated with exchanging currencies in a currency pair, where the available exchange rate in the FX market over time. For example, a currency exchange rate for a currency pair (e.g., EUR/USD) may be quoted at a first rate at a time 0. A short time later (e.g., about 10 minutes, about 30 minutes, etc.), another currency exchange rate quote may be provided for the same currency pair, where all other terms remain the same but having a second exchange rate that is different than the first rate. Once the FX forwards are entered, the exchange rate will remain fixed for the lifetime of the FX forward. Over time, a FX forward purchaser (e.g., an individual, an organization, a business, etc.) may develop a portfolio of FX forwards, including Non-Deliverable Forwards, Deliverable Forwards, Cash Settled Forwards, and/or the like. Few, if any, FX forwards may have the same exchange rate, resulting in a large number of FX forwards to remain open on the organization's books.

An organization or an individual may enter into multiple FX forwards during a given time frame (e.g., a day, a week, a month, etc.) and, as a result, may have multiple line items in their books in relation to these FX forwards. For example, a customer may have a first FX forward for exchanging a set amount (e.g., $100 million) of a first currency for an amount of a second currency, as defined by the Fixing Price (or Fixing Exchange Rate), and a second FX forward for exchanging an amount of the second currency for the same set amount (e.g., $100 million) of the same currency. Although these FX forwards are associated with the same notional amount of the first currency, the associated exchange rates are likely to be different. As such, these FX forwards will not directly net out. Rather, the $200 million in gross notional remains open on the organization's books. These FX forwards may further be subject to regulatory requirements, such as governmental requirements, international banking requirements (e.g., BASEL 3 requirements), and/or the like. These regulatory requirements may, in turn, subject the organization to capital charges (e.g., a specified cash reserve) to ensure that a financial organization has enough cash to cover their liabilities regarding their FX forwards portfolio.

In one example, a financial institution may have a house account having a number of FX forwards open in the account. Under the regulatory requirements, the financial institution is required to set aside capital (e.g., a margin account) to cover the open FX forwards. This cash requirement may be dependent upon, at least in part, on the gross notional amount and/or the total clearing line items associated with the FX forwards portfolio. As such, the financial organization can reduce its capital requirements by reducing the number of line items on their books, and/or by reducing the gross notional of the FX forwards portfolio.

Although described in connection with examples involving data objects representative of foreign currency exchange (FX) trades, the disclosed methods and systems are useful in connection with other types of data objects. For instance, the data objects may be representative of other types of trades or transactions, such as various types of OTC transactions, including, for instance, interest rate swaps, equity contracts, commodities (e.g., energy, metals, agricultural products, etc.), and credit contracts. The disclosed methods and systems may be used in connection with any other market now available or later developed. Still other types of data objects may be processed by the disclosed methods and systems, including, for instance, other data storage or processing systems for which data compression is useful. The types, sources, and other characteristics of the data objects may vary accordingly.

Due to the nature of FX trading, a given portfolio may include a large number of trades, and thus a large number of individually unique positions, also referred to as line items. Each FX trade presents a pay position and a receive position for each party to the trade. Each portfolio may include a large number of similar, but not identical, positions. As a result, a new function for clearinghouses to net similar but not identical line items is warranted. The exchange or central counterparty has robust capability to allow a trader to initiate a position (e.g., buy or sell) or unwind the same position (e.g., sell or buy), where unwinding a position may be understood to have an opposing or counter effect as initiating a position. However, the central counterparty has no mechanism to group positions by similar characteristics and then eliminate overlapping line items. In some cases, compression may involve or refer to netting non-identical line items.

Compression generally reduces the notional value of economically offsetting positions without having to necessarily unwind exactly the same position that was initiated. Previous systems have employed compression generally in dealer-to-dealer trading. Given the homogeneity of the user base in existing systems, previously there was little need for systems to accommodate unique compression criteria. However, as the user base for FX transactions grows, so too do the differences in compression criteria, and the need to pair large numbers of potentially disparate users.

Further, as was described, positions in one portfolio cannot necessarily be netted or consolidated without affecting counter-positions held in the portfolios of the counterparty market participants thereto, which may have different criteria for determining nettable/consolidatable positions according to their unique economic purpose. In addition, in some cases, a central counterparty may prohibit or inhibit each market participant from being privy to the portfolios and/or criteria of other market participants so as to preserve the anonymity thereof.

FIG. 1 depicts a trading network environment for implementing trading systems and methods with credit control in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided, which may process account information that may be used during trades and/or credit control, as described below. A match engine module 106 may be included to match bid and offer prices and may be implemented with software that executes algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users.

A risk management module 134 may be included to compute and determine a user's risk utilization in relation to the user's defined risk thresholds. In some cases, the risk management module 134 may be used to implement provide other services, such as compression-related and other data object set processing services, examples of which are described herein, and as will be addressed in connection with the example of FIG. 2.

An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

Any number of the above-described trading system components may be used or otherwise involved in implementation of the compression-related and other data object set processing of the disclosed methods and systems.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet based computer device, or other wireless device, may communicate with the LAN 124 and/or the Internet 126 via radio waves, such as via Wifi, Bluetooth and/or a cellular telephone based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers that may maintain a market by providing constant bid and offer prices for a derivative, security, or other financial product to the exchange computer system 100, such as via one of the example computer devices depicted. The exchange computer system 100 may also exchange information with other trade engines, such as trade engine 138.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The exchange computer system 100 may be configured to implement the data object set processing of the disclosed embodiments in connection with FX and/or other trades. In such cases, a data object corresponds with each trade. A set of data objects may correspond with a portfolio of a party, such as a bank. The processing of the set of data objects may then involve or include compression or reduction of the portfolio. The compression and other data object processing is applied to the portfolios of multiple parties. Thus, the set of data objects processed by the disclosed embodiments includes the portfolios of the multiple parties.

The data object set processing involves reduction of bilateral risk between parties. The bilateral risk with a particular party arises from the positions in a portfolio having the particular party as the counterparty. As described further below, processing the set of data objects for purposes of both compression of one or more portfolios as well as bilateral risk reduction of one or more portfolios provides additional opportunities, or degrees of freedom for an optimization procedure involved in the processing.

In the example of FIG. 1, such data object optimization and other processing services provided by the disclosed embodiments may be implemented as part of, or otherwise in connection, with the risk management module 134 and/or another module or component of the exchange computer system 100. Other module(s) and/or exchange computer systems may be used to provide the compression service(s). For example, the disclosed embodiments may be implemented by the module(s) and/or exchange computer systems described in U.S. Pat. No. 8,494,953 ("Interest rate swap compression match engine"), U.S. Patent Publication No. 2015/0262305 ("Coupon blending of swap portfolio"), and U.S. application Ser. No. 15/812,573 ("Listed options position compression system"), the entire disclosures of each of which are hereby incorporated by reference and relied upon. Alternatively or additionally, the disclosed embodiments may be implemented in connection with another computer system, such as the computer system of a third-party service provider engaged by a market participant for data object set processing, including, for example, a compression vendor. In still other cases, the disclosed embodiments may be implemented by an entity, e.g., a bank, holding or otherwise controlling the portfolio (or set of data objects) to be compressed or otherwise processed.

The disclosed methods and systems, in some embodiments, provide the ability to increase (e.g., automatically increase) the number of degrees of freedom in risk-free compressions, which results in a smaller data representation of an FX or other portfolio, and may also be associated with a lower capital charge for parties (e.g., banks). From a technical perspective, use of the disclosed methods and systems for portfolio compression results in fewer redundant FX records and transactions stored, maintained and administered to represent a net portfolio. Reducing the number of records provides the technical benefit of lowering the storage and processing load of the exchange computer system 100 and/or other computer systems involved in the transactions, thereby improving the speed and other performance parameters of such systems. Reducing the number of records may also result in fewer or less burdensome communications or other data transmissions, thereby lowering network traffic or other network loads.

FIG. 2 depicts a system 200 for processing a set of data objects. The processing includes data object compression and reduction. The system 200 may correspond with some or all of the components of the trading environment or exchange computer system described above in connection with FIG. 1. For instance, one or more elements of the system 200 may be or otherwise correspond with the risk management module 134 (FIG. 1). In this case, the system 200 includes a processor 202 and a memory 204 that may be part of the risk management module 134 and/or another module or processor. In some cases, the processor 202 is or includes a customized processor, rather than a general-purpose processor or generic processor. For instance, the customized processor may include one or more hardware components configured to implement one or more aspects of the disclosed methods or systems.

In the example of FIG. 2, the set of data objects processed by the system 200 are representative of FX or other trades. The processor 202 may accordingly be in communication with the trade database 108 to obtain the set of data objects and effectuate adjustments thereto. Alternatively or additionally, the processor 202 communicates with the account data module 104 and/or the trade engine 138 to obtain and/or adjust the set of data objects. In some cases, such communications to and from the processor 202 may be implemented via the distributed network 214.

The memory 204 is coupled with the processor 202 to provide access to computer-executable instructions stored on the memory 204. The instructions are directed to the data object set processing described herein. In this example, the memory 204 includes eight sets of instructions arranged in respective logic units stored therein. Each logic unit is executable by the processor 202. The number of logic units or instructions sets may vary. For example, the instruction sets may be integrated with one another to any desired extent. Alternative instructions may also be included.

The system 200 includes first logic 206 that, when executed by the processor 202, causes the processor 202 to obtain a set of data objects from a plurality of data sources. In some cases, obtaining the set of data objects includes accessing a memory. Alternatively or additionally, data indicative of the set of data objects may be provided, e.g., by respective sources of the data objects, such as parties holding a portfolio of trades.

Each data object specifies various types of information. For instance, the information may identify the data object. Such identification data may specify, for example, one or more data sources linked to, or otherwise associated with the data object. For instance, one data source may be indicative of the party or portfolio with which the data object is associated. Another data source may be indicative of a counterparty. Still other identification data may be indicative of a data object type, such as a particular FX product.

Other information may also be specified, including a size and a polarity of the data object. For example, the size may correspond with the gross notional amount of an FX trade. The polarity may be representative of whether the position is a buy (long) or sell (short) position. In some cases, buy positions have positive polarity, and sell positions have negative polarity. The polarity designations may vary in other cases, e.g., in accordance with the nature of the positions or data objects.

The set of data objects may include the data objects representative of each transaction, or position, of a portfolio of a participant interested in gross notional compression. The set of data objects may also include the data objects that establish each net position, or composite magnitude, of a participant interested in bilateral risk reduction.

The system 200 includes second logic 208 that, when executed by the processor 202, causes the processor 202 to obtain optimization constraint data for each data source of the plurality of data sources. In some cases, obtaining the optimization constraint data includes accessing a memory. Alternatively or additionally, data indicative of the optimization constraint data may be received from the respective sources of the data objects, such as parties holding a portfolio of trades. For example, each data source may provide a configuration file that specifies constraints on the optimization relating to that data source.

The optimization constraint data may include one or more tolerance levels for the adjustments to be considered in the optimization process. For example, one type of tolerance level constraint specifies whether and/or the extent to which the adjustments may result in a non-risk neutral change in a particular market. Such constraints may be specific as to time or time period. For instance, a party may permit a non-risk neutral change of up to 10% during the next six-month time period, but not permit such changes beyond the next six months. Other constraints related to the adjustments may limit the sum of the adjustments (e.g., overall for all participants, or for each participant) to no more than a stipulated magnitude (e.g., zero or a non-zero number). Such limits may be stated for various categories, such as per currency, per currency and end date, and per time period (e.g., week). If the level is non-zero, further tolerance levels for adjustments may be established, including, for instance, daily, weekly, monthly, and yearly.

Other types of optimization constraints may be specified, including other types of preferences for the optimization. For example, the optimization constraints may include weighting factors indicative of whether a certain type(s) of benefit (e.g., compression) resulting from the adjustment should be weighted more heavily during the optimization than another type(s) of benefit (e.g., data link reduction). The weighting factors (and/or other optimization constraints) may also specify whether compression or link reduction should be considered (e.g., weighted) at all during the optimization for a particular data source. For instance, some data sources may be interested in only one of compression and link reduction.

The optimization may be configured via still further constraints. For instance, the total gross average magnitude cannot increase for participants electing to reduce data set aggregate magnitude (e.g., gross notional compression). The total ratio between added data set aggregate magnitude (e.g., gross notional magnitude) and reduced data link composite magnitude (e.g., bilateral net position) cannot be negative for participants electing to reduce data link composite magnitude (e.g., bilateral risk reduction). In other words, for each increase in aggregate magnitude, at least the same amount of data link magnitude must be reduced. For participants electing to reduce data link composite magnitude (e.g., bilateral risk reduction), each net position (e.g., total or daily) is not allowed to change sign, direction or polarity (e.g., a positive position becoming negative, or a negative position becoming positive). For participants electing to reduce data link composite magnitude, the sum of adjustments in composite magnitude cannot be negative for a particular time period (e.g., daily, total, etc.). In other words, for each participant, composite magnitudes may increase against some participants, but overall, across all participants in an optimization, the net positions must improve. Each composite magnitude participant may also establish one or more further constraints not to allow total composite magnitudes to increase against any respective participant.

The system 200 includes third logic 210 that, when executed by the processor 202, causes the processor 202 to identify those data objects of the plurality of data objects for which the identification data matches. The identification data matches if, for instance, the same data object is identified by two data sources. In an FX and other trading examples, the identification data matches if both parties to a trade identify their respective positions. In that case, the trade is eligible for adjustment via the data object processing, including, for instance, termination or other nullification. If both parties to a trade (or other data sources) do not identify the data object, then the data object is not eligible for processing.

The identification data used for matching purposes may vary. In some cases, the identification data may identify the data sources. Alternatively or additionally, the identification data is representative of a data object identifier, such as a trade identification number.

The system 200 includes fourth logic 212 that, when executed by the processor 202, causes the processor 202 to implement an optimization procedure. The optimization procedure is configured to determine an optimal set of adjustments to the set of data objects that maximizes reduction of both a data set aggregate magnitude and a data link composite magnitude for at least one pair of the plurality of data sources.

The data set aggregate magnitude is indicative of a sum of the size of each data object of the set of data objects. In some cases, the data set aggregate magnitude is an absolute value summation of the sizes of the data objects in the set of data objects. In financial cases, the data set aggregate magnitude may correspond with the total gross notional amount presented by the set of data objects. For example, the optimization may evaluate reduction of the total gross notional amount while also taking into account (e.g., attempting to improve) the data link composite magnitude(s) of interested parties, such as a bilateral net risk amount as described below.

The data link composite magnitude is indicative of a sum of the sizes of those data objects of the set of data objects linked to the pair of data sources. Each data source may accordingly have a number of data link composite magnitudes, i.e., one for each other data source. In some cases, the sum of the sizes for the data link composite magnitude is a net sum that accounts for the polarity of each data object. In financial examples, each data link composite magnitude may correspond with the bilateral or counterparty risk amount presented by the positions in a portfolio. The bilateral risk amount may thus be a net amount at risk in connection with the counterparty.

The optimization may be configured to minimize the data set aggregate magnitude and the data link composite magnitude(s) presented by the set of data objects after the adjustments, while satisfying one or more constraints on the optimization. In trade examples, the problem solved by the optimization may be characterized as finding the set of adjustments, including the possible addition of new data objects, that results in the minimal amount of data set aggregate magnitude and the data link composite magnitude (s), while still satisfying the constraints. The nature of the magnitudes minimized by the optimization may vary in accordance with the nature of the data objects, as described herein.

The optimal set of adjustments includes an offset of multiple data objects of the identified data objects of same data object type and opposite polarity. Each one of the data objects identified as eligible for adjustment may be offset with another data object of the same type. The opposite polarity allows the offset to result in termination or other nullification of one or both of the data objects. In financial examples, the same object type may be a particular FX trade (e.g., USD/EUR) with the opposite polarities corresponding with buy and sell positions. To address positions having unequal exchange rates, the constraint data of a particular party may allow for movement in net market positions by, for instance, specifying a respective differential to be tolerated for each currency pair.

Alternatively or additionally, the optimization may include or involve adding data objects (e.g., transactions). The added data objects provide further variables to be adjusted via the optimization. For example, transactions with different rates (e.g. two different rates, long and short) may be added to handle unequal exchange rates. A combination of transactions may thus be added to address the residual or difference presented by the unequal exchange rates. Further details regarding the addition of data objects are provided below in connection with the configuration of the optimization procedure.

The optimization procedure is implemented in accordance with the obtained optimization constraint data. The optimization constraint data includes tolerance data indicative of a limitation on an extent to which the optimization procedure is permitted to consider adjustments that result in deviation in a net size of the data objects of a respective data source of the plurality of data sources. The net size may be specific to the data object type. Each data source may thus specify constraint data for a number of different data object types. The net sizes or other constraint data may be specified as a function of time. The net size or other constraint data may thus vary over time. In financial examples, the net size may correspond with the amount that a market position established via a number of positions held in a particular market may deviate from a risk neutral adjustment. For instance, a party may specify via the optimization constraint data that its USD/EUR position not deviate more than 10% during the next six months, not more than 5% in the following six months, and not more than 15% in the second year. The constraint data may be specified in ways other than a relative percentage. For instance, the constraint data may be specified as a pair of absolute numbers, one for each direction.

The optimization constraint data is not limited to establishing tolerances or limitations on the set of adjustments. For instance, the optimization constraint data may include empirical optimization weighting data, such as weighting data derived from empirical research. For example, the empirical research may be directed to weighing an extent to which reductions to the data set aggregate magnitude are weighted relative to reductions to the data link composite magnitude for a respective data source of the plurality of data sources. More generally, such empirical optimization weighting data and other configuration data may be established via configuration settings for the optimization rather than as constraint data set by the data sources. For instance, the configuration data may indicate an extent to which reductions to the data set aggregate magnitude are weighted relative to reductions to the data link composite magnitude for a respective data source of the plurality of data sources given preferences specified by the data sources. Some data sources may elect to not give any weight to one type of reduction. For instance, the optimization weighting data of a first data source may specify that, with regard to its data objects, only the reductions to the data link composite magnitude are to be given weight in the optimization procedure. In contrast, the optimization weighting data of a second data source may specify that, with regard to its data objects involving the second data source, only the reductions to the data set aggregate magnitude are to be given weight in the optimization procedure. Still other data sources may elect to give some, but not as much, weight to one type of reduction relative to the other type of reduction. In such cases, the weighting may be expressed as a number falling in a range from 0.0 (no weight) to 1.0 (full weight). Other types of weights may be used, including, for instance, a binary weighting scheme that toggles between full weight (1) and zero weight (0).

The types of constraints and other characteristics of the optimization constraint data (as well as other aspects of the optimization process) may include those described in U.S. Pat. No. 8,606,688 ("System and method of implementing massive early terminations of long term financial contracts"), the entire disclosure of which is hereby incorporated by reference. Additional or alternative types of constraints and optimization constraint data may be used.

The system 200 includes fifth logic 214 that, when executed by the processor 202, causes the processor 202 to store data indicative of the optimal set of adjustments to the set of data objects. The adjustment data may be stored in the memory 204 and/or another memory. For instance, the adjustment data may be stored in a data storage unit coupled to, in communication with, or otherwise associated with the system 200, or one of the computing components of the exchange computer system 100 (FIG. 1), such as the trade database 108 (FIG. 1), or one of the modules thereof, such as the trade engine 138 (FIG. 1) for execution of one or more trades. In some cases (e.g., when a processor of the exchange computer system is implementing the fifth logic 214), the fifth logic 214 may cause the processor 202 to execute the one or more trades (e.g., complete the financial transaction (s) associated with the trade). Alternatively or additionally, the fifth logic 214 causes the processor 202 to transmit the adjustment data to a computing system or device, e.g., for storage on a data storage unit or other memory thereof.

In the example of FIG. 2, the system 200 includes sixth logic 216 that, when executed by the processor 202, causes the processor 202 to configure a linear optimizer in accordance with the obtained optimization constraint data. The linear optimizer is used to implement the optimization procedure. In some cases, the linear optimizer may be or include the Primal Simplex or Dual Simplex optimizers. In other cases, additional or alternative optimizers are used, including, for instance, interior point procedures followed by a simplex cross-over phase procedure.

The configuration of the linear optimizer may also include defining a set of data objects eligible for processing. The set of data objects may include the creation of data objects. Data objects may be created based on the data objects and/or other information (e.g., composite or net magnitude information) received or obtained from the data sources. For instance, the type and relationships of the data objects created may depend upon the data objects received from the data sources. In some financial cases, for example, data objects may be created for each type of transaction (e.g., currency pair and end date) in a portfolio of a participant. If two participants have at least one transaction between each other (that is, a relation exists), then the new transactions of those types are added between the two participants. In other words, between all existing relations, in all data object types where two participants have transactions, new transactions are added for processing via the optimization.

Alternative or additional data objects may be created or added based on the composite or net magnitude information received or obtained from the data sources. If two data sources (e.g., participants) have both submitted a net position against each other, a relation exists, and new transactions of all of the data object types present in a participant portfolio are added as described above. The data objects present in a participant portfolio may also be adjusted to include all of the data object types for which a participant has submitted a net position for processing. The expansion of either the relations or the data object types in these ways may open new possibilities to add yet more data objects, as described above. That is, if two participants have a relation between each other and they have both transactions or net positions of a certain data object type against any other participant, new data objects may be added in those cases as well.

Each such created or added data object may begin the optimization with a magnitude (e.g., a notional amount) of zero. The magnitude may be increased during the optimization if the increase results in a better outcome (e.g., through the reduction in data set aggregate magnitude and/or data link composite magnitude).

In some cases, multiple data objects (e.g., transactions) are added. For example, four new transactions are added for each data object type. Two of the data objects have one polarity (e.g., a transaction in a first direction), while the other two data objects have the opposite polarity (e.g., a transaction in a second, opposite direction). In financial examples, the transactions in the first direction may have two different rate magnitudes (for example, FX rates between the two future amounts). The transactions in the second, opposite direction may also have two different rate magnitudes. The difference between the two rate magnitudes may be restricted by participant constraint. The most restrictive level is used between any pair of participants.

The above-described procedures for addition of data objects eligible for processing via the optimization may be implemented by logic other than the sixth logic 216. For instance, the third logic 210 may cause the processor to determine the eligible data objects to be added.

In the example of FIG. 2, the system 200 includes seventh logic 218 that, when executed by the processor 202, causes the processor 202 to terminate, cancel, delete, or otherwise nullify one or more data objects in accordance with the set of adjustments. In such cases, the set of adjustments includes one or more offsets that results in the nullification(s). For instance, two or more data objects may cancel one another. In financial cases, a buy position may be offset against a sell position. The buy and sell positions may be terminated (or partially terminated) accordingly. Further details regarding examples of such nullifications are set forth below.

In the example of FIG. 2, the system 200 includes eighth logic 220 that, when executed by the processor 202, causes the processor 202 to incorporate one or more new data objects into the set of data objects to effectuate one or more of the adjustments. The new data objects may be defined as a result of the adjustments, or to effectuate the adjustments, as described below. In financial cases, incorporation of the new data objects may or may not involve or include execution of one or more trades. For instance, the incorporation may involve or otherwise include modifying a spreadsheet or other data structure or record in which the data object set is presented. In such cases, one or more acts associated with the adjustments, such as execution of trades, may occur subsequently or separately.

As described above, the optimization procedure may be configured to consider adding a new data object to the set of data objects in connection with determining the optimal set of adjustments. For instance, a new data object may be added to improve the reduction of a data link composite magnitude. The new data object may thus offset one or more existing data objects as a result of having an opposite polarity. In financial cases, the new data object may thus be used to reduce bilateral or counterpart risk. The overall benefit of adding the new data object may outweigh the increase in data set aggregate magnitude (e.g., gross notional amount).

Any of the newly added, eligible data objects that were not adjusted by the optimization from the initial magnitude of zero are not incorporated into the set of data objects. The eighth logic 220 may cause the processor 202 to discard any such zero-magnitude data objects.

Additional or alternative logic sets may be included. For instance, in the example of FIG. 2, the system 200 may include further logic involved in the creation of one or more new data objects. Such further logic may cause the processor 202 to configure new data objects by scaling or otherwise adjusting one or more properties, such as a magnitude property, for each respective data object. Such scaling or other adjustments may be used to configure the new data objects for the above-described offsetting. The offsetting may occur because the selected new data objects and the existing data objects have opposite polarities. In cases involving trades, the opposite polarities may correspond with the buy and sell positions established by the trade. In trade cases, the magnitude property may be the notional of an FX position. Another property may be or relate to the exchange rate. Examples of the resulting offsetting are described below. The nature of the magnitude or other property may vary in accordance with the nature of the data objects.

One or more additional logic sets may be provided for processing after the optimization. The results of the optimization may be processed to reduce the total number of data objects (e.g., transactions). For example, the optimization may produce a set of data objects in which multiple data objects of the same type (e.g., same currency pair and end date) exist between two data sources (e.g., participants). The data objects may include pre-existing data objects that were not modified by the optimization, pre-existing data objects that were modified (e.g., increased or decreased), or data objects that were created or added. In such cases, the net magnitudes between each pair of data sources (e.g., participants) for each such data object type may be calculated (e.g., two position magnitudes in an FX trade). An attempt to represent the net magnitudes with a single data object (e.g., a single transaction). If that is not possible, e.g., due to stipulated rules from participants or the CCP, such as minimum magnitude or largest magnitude difference on a single transaction, two valid data objects (e.g., transactions) are created to represent the net positions.

The optimization may implement an objective function to determine the set of adjustments that minimizes the above-referenced magnitudes. The optimization may thus be configured to maximize the reduction in the costs for the participants by maximizing the reduction of gross notional, net position, and/or other magnitudes.

The objective function may associate one or more costs to each data object. In one example, a data object may contribute a cost in connection with data set aggregate magnitude (e.g., gross notional) and a cost in connection with data link composite magnitude (e.g., bilateral risk reduction). The gross notional costs for participants electing only bilateral risk reduction may nonetheless be considered in the optimization to avoid detrimental increases in gross notional for those and other participants.

The costs related to the data link composite magnitude may be translated, or expressed, in terms of the units of the data set aggregate magnitude, or vice versa. In financial examples, the gross notional cost may thus be used as a base for the optimization. The optimization may thus find an optimal solution involving the combination of the costs associated with each magnitude.

To compute the cost in financial examples, such as FX transactions, the average of the two magnitudes (e.g., one for each currency leg) of each transaction may be found. The average may then be translated into a base or common currency for the optimization.

The cost of the gross magnitudes may be configured to be linear with the size of the magnitudes, so the existing transactions have a positive (or beneficial) contribution on the objective function if they are reduced in size, and a negative (or detrimental) contribution if they are increased in size. New transactions are only allowed to increase in size (e.g., from zero), as described above, and will thus always have a negative contribution if they are created.

One example of the manner in which the costs associated with data link composite magnitudes (e.g., bilateral net risk) contribute to the objective function is now described. The absolute value of the composite or net magnitude is used to represent the cost. To allow the contribution to be linear, constraints may be used to prohibit a net position from switching sign. That is, constraints are used to prevent a positive net position to become negative, and a negative net position to become positive. The problem is thus transformed to a linear model, thereby allowing linear optimizers to be used. This transformation is useful because the linear optimizers, such as those referenced above, are faster and more precise relative to others, such as non-linear optimizers. While optimizers that are capable of handling absolute values in the objective function, such as those involving mixed integer programming, may be used, the computational burden may be increased relative to that presented by linear optimizers.

The transformation to a linear model may also result in other constraints. For instance, one such constraint may constrain an existing transaction in a data object type for which the submitted net position is zero to only decreases in size. New trades are added instead. If the existing transaction could both increase and decrease in size in a linear model, it would not be possible to model that both cases should have a negative contribution to the objective value. Instead, the transaction is split into an original transaction and one or more new transactions, where it can be modelled separately if the magnitudes decrease or increase in size.

Participants who are reducing net positions can elect to optimize on different time periods, e.g., the daily net positions or the total of all days. The objective function may then be configured accordingly.

The contribution from submitted net positions is calculated as a percentage increase, or add-on, which may be added to the gross objective contribution for a transaction. That is, the objective contribution from the gross component may be increased or decreased in accordance with the percentage of the add-on.

The add-on may vary based on the nature of the net position. For example, the add-on may be initialized to 0%. If the first participant of the transaction is optimizing on daily net positions (e.g., to reduce the sum of the absolute value of all daily bilateral net positions as much as possible), a predetermined amount (e.g., 10%) may be added or removed to the add-on for each magnitude of the transaction (e.g., two in the case of FX transactions) if reducing the size of the transaction is reducing/increasing the size of the net position against the second participant in the node of the transaction. In other words, if reducing the size of the transaction is reducing the net positions, the objective value should be larger, and vice versa. A zero net position would remove 10% both if a transaction is increased or decreased in size. The process described above may then be implemented again but for the second participant of the transaction. It should be noted that, even though the first participant may be optimizing on daily net positions, the second or other participants may or may not be optimizing on measures other than daily net positions, including, for instance, gross notional reduction, and total net position. In such cases, one or more of the participants may benefit through termination of an existing transaction if, for instance, the termination reduces the bilateral net exposure on a particular day (e.g., settlement day), the gross notional, the total net position, etc.

If both of the first and second participants are optimizing on daily net positions, the add-on may be increased, e.g., multiplied by a predetermined factor, such as 4.

If the first participant is optimizing on total net positions, a predetermined amount (e.g., 80%) may be added or removed to the add-on for each magnitude of the transaction if reducing the size of the transaction is reducing/increasing the size of the net position. This process may then be implemented again but for the second participant of the transaction.

The optimization may be configured to minimize the above-referenced magnitudes for a predetermined number of time periods. For instance, in financial examples, each time period may correspond with a segment of time for which a bank collectively evaluates the cash flows to determine a sum of gross notional, a net position, and/or other magnitudes. Each magnitude acts as a constraint on the optimization. In FX and other trading examples, the magnitudes may correspond with risk levels. In such cases, one or more constraints may be directed to requiring the adjustments to the set of data objects to maintain a flat (e.g., risk neutral) position during each time period. In other cases, some fluctuation in risk level may be tolerated. In such cases, one or more constraints specified by each party may be directed to limiting fluctuations in risk (e.g., in each time period) to a respective tolerance level. Further details regarding example constraints are provided below. The configuration of the optimization may vary in accordance with the nature of the data objects.

Further details regarding the functionality provided via execution of the above-described logic units, and by the system 200 more generally, are provided in connection with the examples described below.

Figure 3:
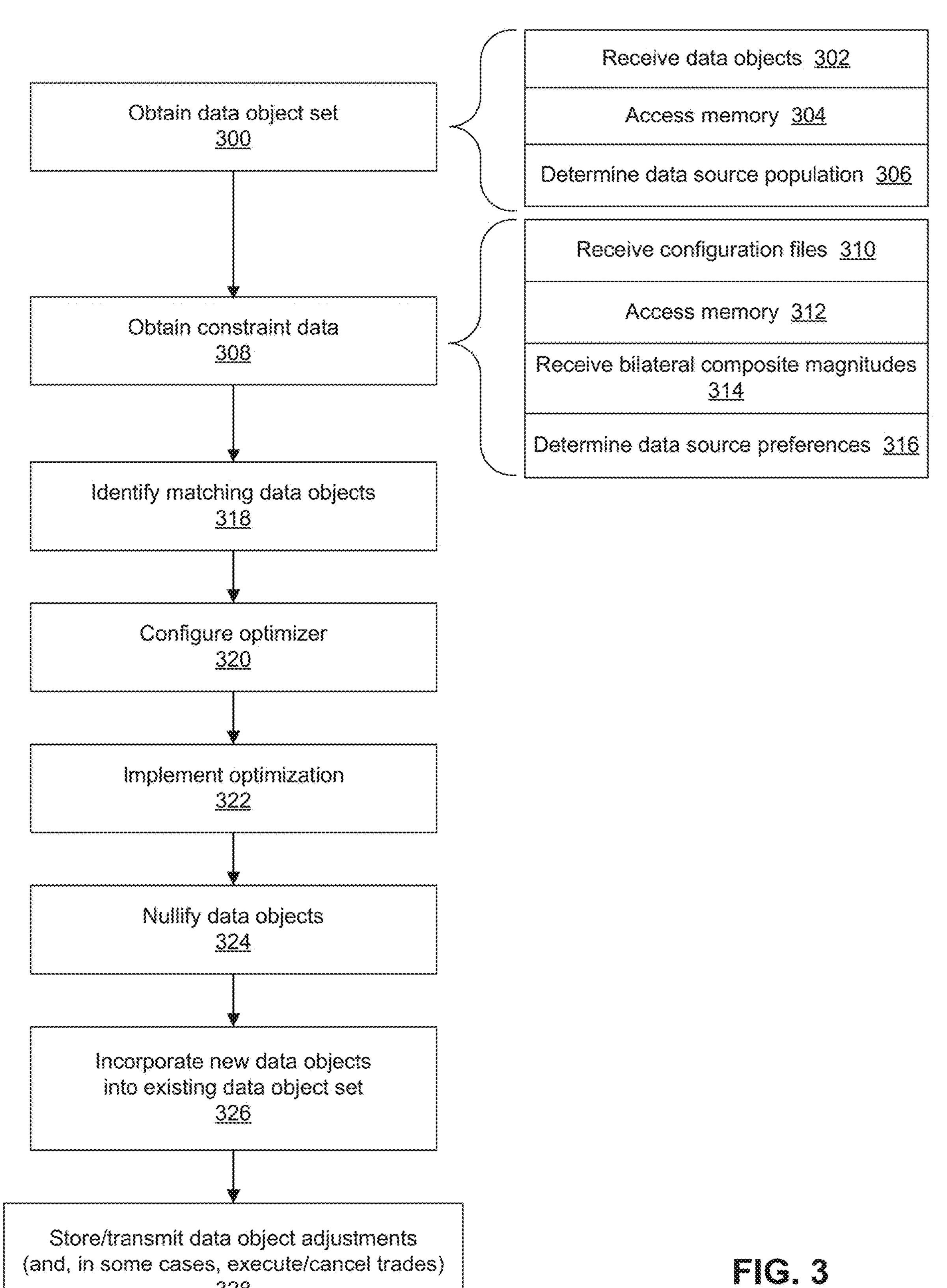
FIG. 3 is a flow diagram of a method for data object compression and reduction via multi-purpose optimization in accordance with one example involving, in some cases, trade-based data objects.

FIG. 3 depicts a computer implemented method for processing a set of data objects. The method may show an example of the operation of the system 200 of FIG. 2, or another system.

Each act of the method is implemented by a processor, such as the processor 202 in the example of FIG. 2, a processor of the exchange computer system 100 in the example of FIG. 1, and/or another processor. The processor may be a processor used to implement a risk management module and/or another management processor. The processor may include any number of processors, such as processing cores or units, and may be disposed in any arrangement.

The method may begin with one or more acts directed to obtaining a set of data objects [block 300]. In some cases, the data objects may be received from the data sources [block 302] and/or another computing system. Alternatively or additionally, the data objects have been previously received, and the set is obtained by accessing a memory in which data indicative of the set is stored [block 304]. In the example of FIG. 3, obtaining the set of data objects may include a determination of the data sources [block 306]. The population of the data sources may be determined to support the configuration of the optimization and/or other aspect of the data processing.

Optimization constraint data is also obtained [block 308]. The constraint data may be obtained contemporaneously with, or separately from, the data objects. For instance, each data source may send a data package including its data objects and constraint data. In some cases, the constraint data is provided via a configuration file for each data source. The configuration file may be received from the data source [block 310] or obtained via a memory access [block 312]. As described herein, the constraint data may relate to limits on bilateral (counterparty) risk or other data link composite magnitudes for those data sources interested in reduction thereof [block 314]. The preferences of each data source may be determined in conjunction with obtaining the constraint data [block 316]. Alternatively, the preferences are determined subsequently, such as in conjunction with configuration of the optimization procedure.

Those data objects having matching identification data are identified [block 318]. Matching data objects have been submitted by each data source of the pair of data sources associated with the data object. Those objects with matching identification data are accordingly considered eligible for adjustments via the optimization.

In the example of FIG. 3, an optimizer is configured [block 320]. The optimizer may be a linear optimizer. The configuration may include processing of one or more configuration files or other data, such as the constraint data. In other cases, the configuration is integrated with the operation of the optimizer.

An optimization procedure is then implemented in accordance with the obtained optimization constraint data [block 322]. The optimization procedure is configured to determine an optimal set of adjustments to the set of data objects that maximizes reduction of both a data set aggregate magnitude and a data link composite magnitude for at least one pair of the plurality of data sources, as described herein. The optimal set of adjustments includes offsets of the identified data objects of same data object type and opposite polarity. Offsetting objects may result in the cancellation, deletion, or other nullification of one or more data objects [block 324]. The set of adjustments may include the creation and incorporation of one or more new data objects into the existing data object set [block 326].

Data indicative of the set of adjustments may then be stored and/or transmitted [block 328]. The storage or transmission destination may vary as described herein.

The order of the acts or steps of the operation may vary from the example shown. For example, the calculation of net positions may occur after the generation of the continuous data streams, or at another time before the optimization procedure is implemented.

Additional, fewer, or alternative acts may be implemented. For example, the configuration of the optimizer may occur as an integrated part of the optimization.

Figure 4:
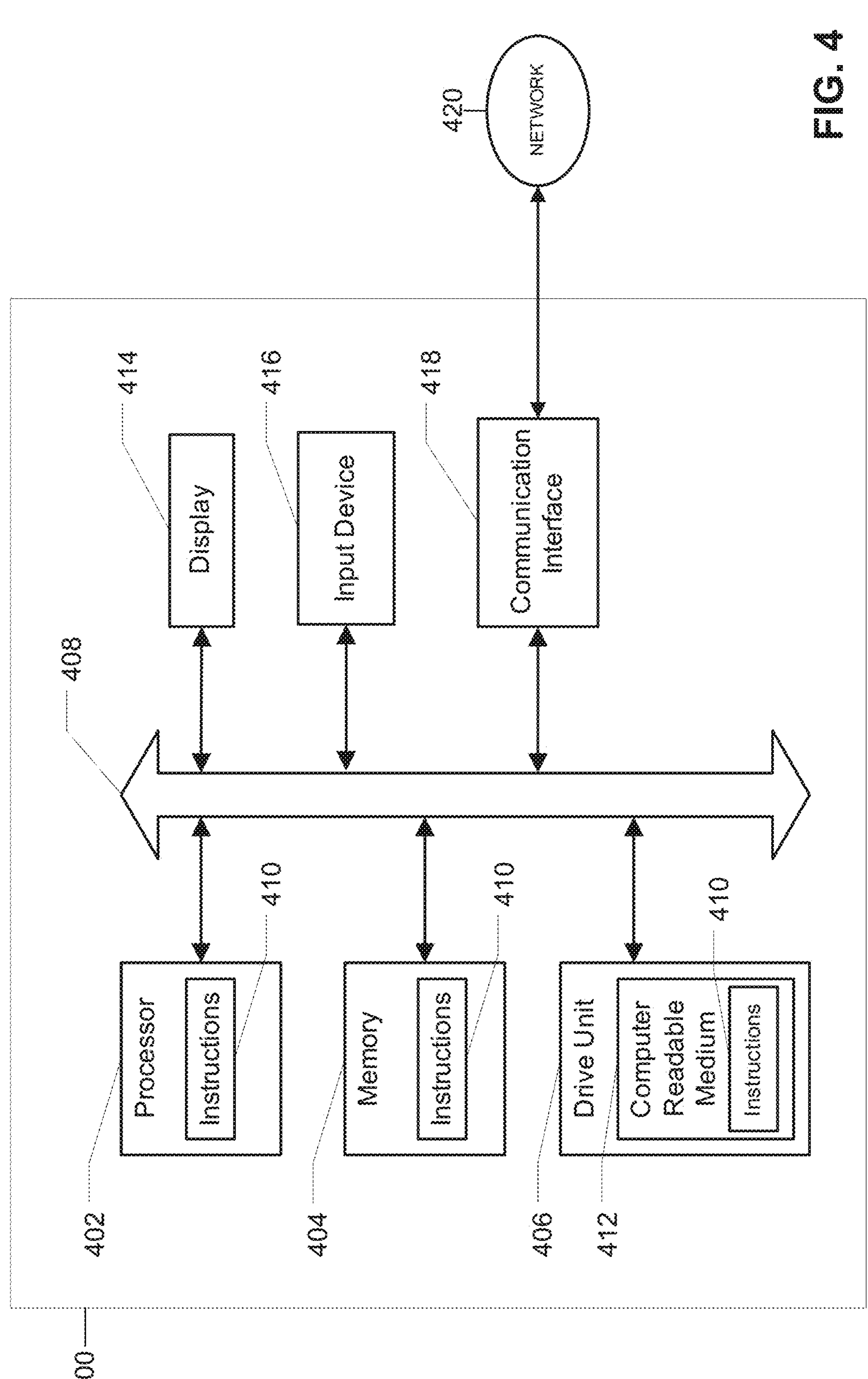
FIG. 4 shows an illustrative embodiment of a general computer system for use in or with the examples of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

Figure 5:
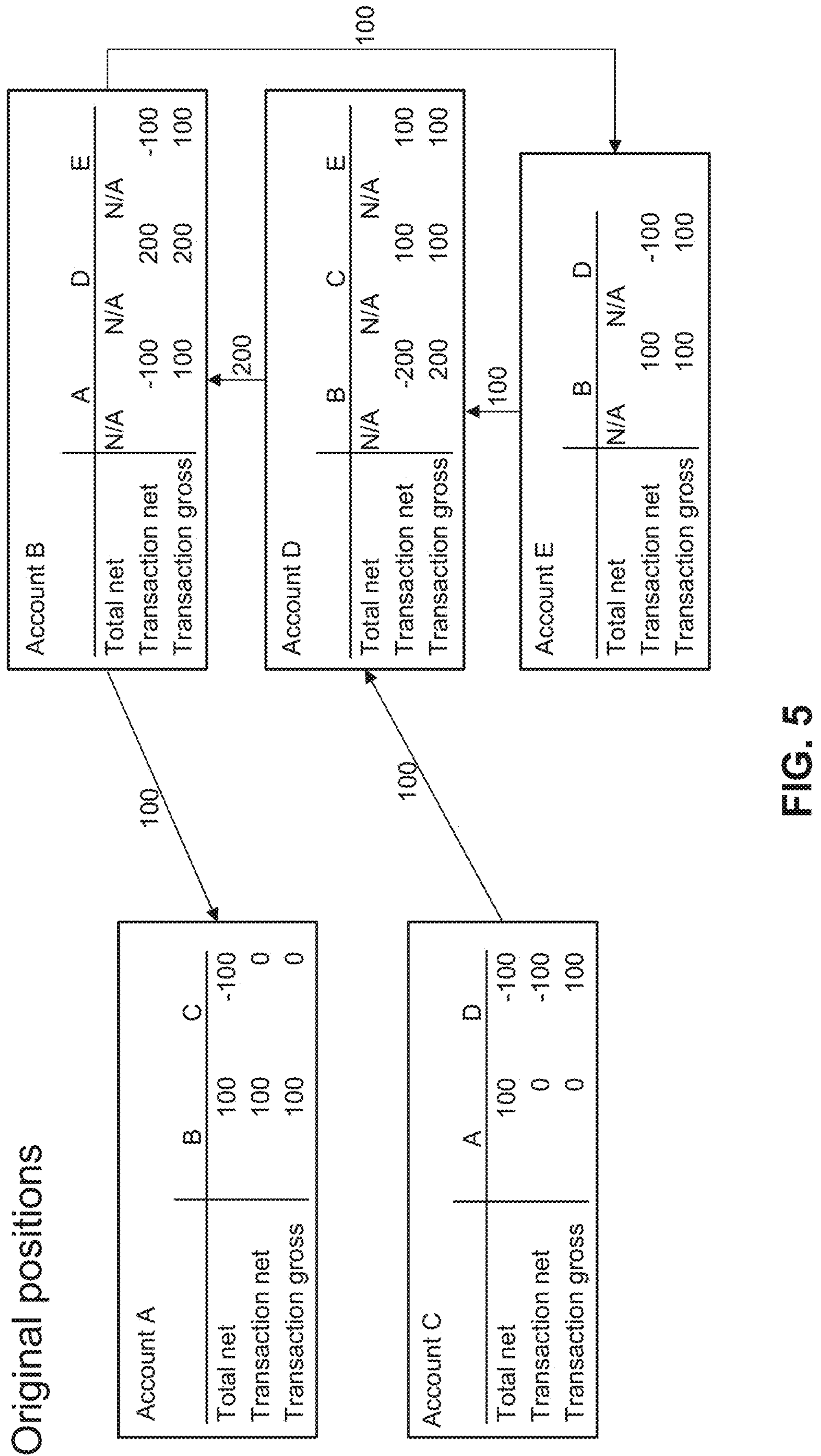
FIG. 5 depicts a financial data object example for data object compression and reduction for a number of data sources (e.g., accounts) involving both gross notional and bilateral risk (i.e., net) amounts.
Figure 7:
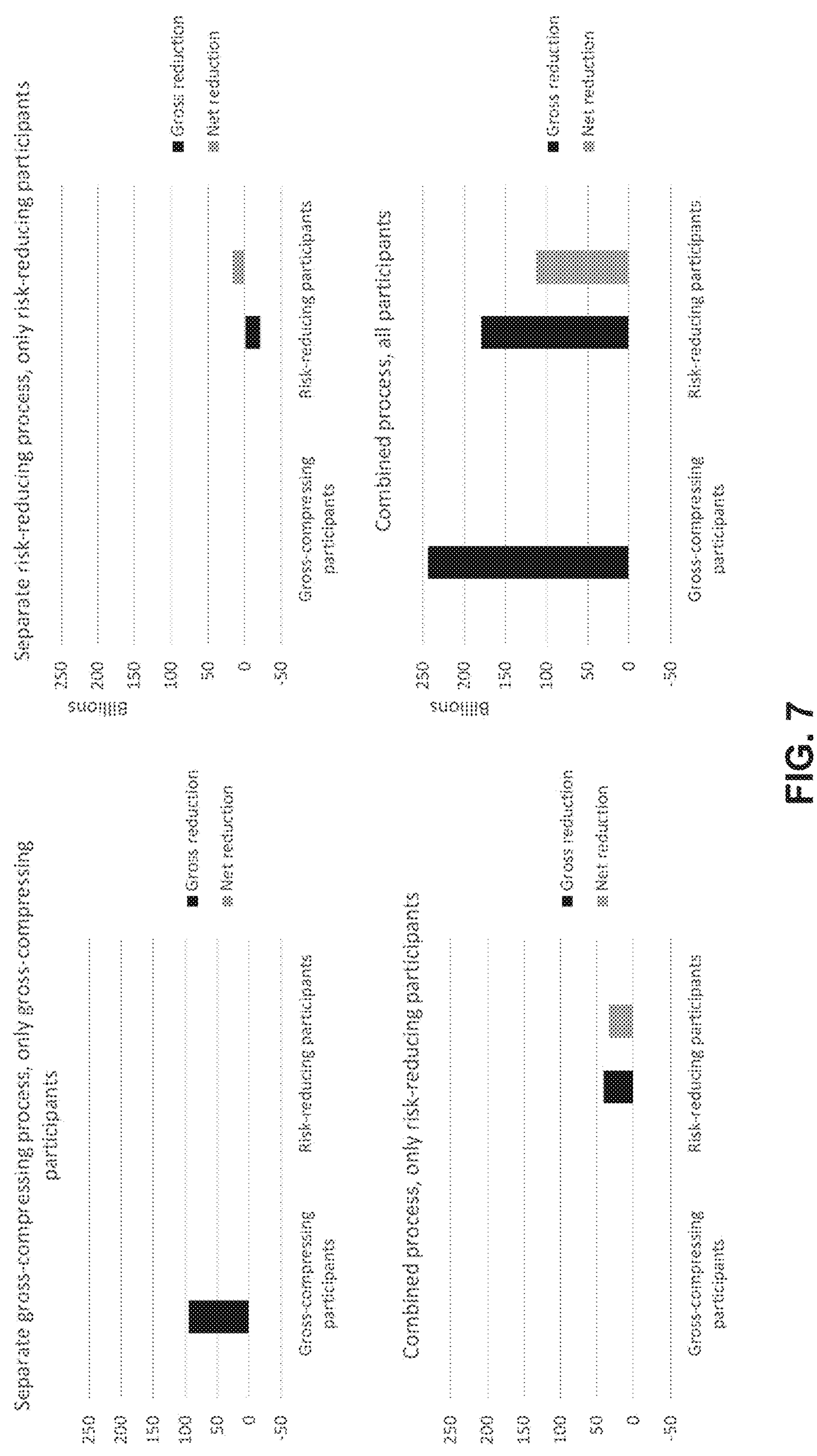
FIG. 7 depicts a number of graphical plots comparing results of the multi-purpose optimization of FIG. 6 with the performance of other compression and/or risk reduction routines involving some or all of the account data sources.

FIGS. 5-7 depict examples in which the disclosed methods and systems for data object compression and reduction are applied in a financial data object example. In these financial data object examples, each data source is an individual account of a market participant, such as a bank.

FIG. 5 depicts an example in which three data sources (Account B, Account D, and Account E) are interested in reduction of data set aggregate magnitude (e.g., gross notional reduction) only and two data sources (Account A and Account C) are interested in reduction of data link composite magnitudes (e.g., bilateral risk reduction). Account A and Account C may or may not also be interested in reduction of data set aggregate magnitude. Links between the data sources established by the data objects are depicted as arrows. In this case, each link corresponds with a transaction between the market participants associated with each account. For example, Account A and Account B have entered into a transaction involving an amount of 100. The polarity of the amount is representative of whether the position is a buy or sell position. The direction of the arrow is indicative of polarity. For instance, an outgoing arrow may be indicative of a sell position, and an incoming arrow may be indicative of a buy position.

The accounts depicted in FIG. 5 provide an example of the manner in which the combination of both types of data sources may achieve additional benefits, i.e., beyond those requested by the data sources. In this case, the data sources interested in only data set aggregate magnitude also receive the benefit of reductions in data link composite magnitudes. The data sources interested in data link composite magnitude reduction also receive the benefit of reductions in the size reductions for data set aggregate magnitude.

If the example of FIG. 5 was applied in a financial context, the example shows how gross notional compression is achieved between and for the risk-reducing participants. Even though their objective is not to reduce gross notional, their existing transactions are eligible for termination. The risk-reducing participants thus achieve a saving by terminating (and, if warranted, adding) transactions between each other to reduce risk. In this example, the risk-reducing participants are now reducing rather than increasing gross notional magnitudes, while the same maximum risk reduction potential is achieved.

By combining the two populations of participants, risk-reducing and gross-compressing, in one optimization, both risk-reducing and gross-compressing participants achieve at least the same benefits (e.g., data storage savings, cost savings, etc.) as if the two populations were handled in separate processes. In practice, including both types of participants increases the degrees of freedom for the optimization and thereby increases the improvements achieved by the optimization.

FIG. 6 depicts the results of the optimization involving the combination of both types of data sources, i.e., a combined process. With all of the participants combined in a single optimization, the optimization is capable of compressing all existing transactions can be compressed and all net positions removed, with only a single trade added between Accounts A and C.

The example of FIGS. 5 and 6 also shows how some data objects may not be eligible for compression. As shown, the transaction net need not equal the total net for a particular account, if some of the net is not eligible. The ineligibility may arise from the risk stemming from a source (e.g., an FX option) other than the trades (e.g., FX Forwards) eligible for compression or other modification. Ineligibility may arise for a variety of other reasons, including, for instance, the trade being connected to other objects that are outside of the scope of the processing, such as when the trade is a part of complex, structured deal.

If the gross notional participants 602 and the risk reduction participants 604 were processed separately, no offsetting can be done between the data objects of the gross notional participants and the risk reduction participants. In that event, Account A and Account B are incapable of achieving any compression or risk reduction. In this example, a triangle of trades is compressed between Accounts B, D, and E.

FIG. 7 depicts a number of scenarios to compare the results of processing a set of data objects via various separate optimizations with combined processing of the data objects of both types of participants.

In the first separate process, a gross-compressing optimization was implemented on only gross-compressing participants. A reduction in gross notional amount of approximately $100 billion USD was achieved. No bilateral risk reduction was achieved by the optimization.

In the second separate process, a bilateral risk optimization was implemented on only risk-reducing participants. A modest amount of bilateral risk was removed at the expense of an increase in gross notional amount.

In the third separate process, the optimization was configured for both gross notional and bilateral risk reduction, but on only on the positions of the risk-reducing participants. In this example, a greater amount of risk reduction was achieved, while also reducing the gross notional amount.

In the combined process, the optimization is again configured for both gross notional and bilateral risk reduction, but now both the gross notional and risk reduction participants are included. The amount of gross notional compressed for the gross notional participants increases significantly. The amount of risk reduction for the risk reduction participants also increases significantly. Notably, the amount of gross notional compression for the risk-reducing parties also increases significantly, which is a result of optimizing with a multi-purpose objective, e.g., on both gross notional compression and risk reduction in a combined process.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented data compression method including:

obtaining, by a processor, a set of data objects for a plurality of currency exchange transactions, wherein for each of the plurality of currency exchange transactions the set of data objects specify:

two data sources as a party and a counterparty;

a type that indicates a base currency and counter currency;

transaction size; and a transaction polarity;

obtaining, by the processor, constraint data based on configuration files for each data object;

identifying, by the processor, a subset of data objects from among the set of data objects associated with a particular data source from among those specified within the plurality of data objects;

automatically triggering and executing, responsive to determining that the set of data objects exceeds a data size threshold, an optimization procedure to determine a set of adjustments to the subset of data objects, the optimization procedure including:

determining an offset that increases, based on the constraint data, an aggregate magnitude of the subset of data objects by increasing a net position size of a subset of the plurality of currency exchange transactions represented by the subset of data objects; and determining, based on the constraint data from the subset of data objects, at least one data object to remove from the subset of data objects;

compressing, the subset of data objects by executing the determined set of adjustments on the subset of data objects by removing the at least one data object and adding the offset to obtain a compressed subset of data objects; and storing, by the processor and in memory, the compressed subset of data objects with the offset in accord with the set of adjustments and without the at least one data object of the subset of data objects, wherein compressing the subset of data objects by removing the at least one data object reduces a total bilateral risk for all parties and all counterparties in the subset of the plurality of currency exchange transactions but is risk neutral for the particular source, the reduction in total bilateral risk being at least at large as the increase to the net position size thereby also reducing a data link magnitude at least as much as the aggregate magnitude is increased without information loss.

2. The computer-implemented data compression method of claim 1, wherein the subset of data objects includes at least a pair of data objects matching in type and transaction size and having opposite polarity.

3. The computer-implemented data compression method of claim 1, further including executing the optimization procedure via a linear optimizer initialized using the constraint data.

4. The computer-implemented data compression method of claim 1, wherein the constraint data includes tolerance data indicative of a limitation on an extent to which the optimization procedure is permitted to consider adjustments that result in deviation in a net size of data objects of any single data source from among the data sources.

5. The computer-implemented data compression method of claim 4, wherein the net size is specific to the data object type.

6. The computer-implemented data compression method of claim 4, wherein the tolerance data is specified as a function of time.

7. The computer-implemented data compression method of claim 1, wherein:

reducing via the optimization procedure includes adding a new data object to the set of data objects in connection with determining the set of adjustments; and the method further includes incorporating the new data object into the set of data objects.

8. The computer-implemented data compression method of claim 1, wherein the constraint data comprises data link composite magnitudes for each data source of the plurality of data sources.

9. The computer-implemented data compression method of claim 1, wherein at least one data object of the set of data objects identifies a bilateral link between at least the two data sources associated with that data object.

10. Non-transitory machine-readable media configured to store instructions for data compression thereon, the instructions, when executed, configured to cause a processor to:

obtain a set of data objects for a plurality of currency exchange transactions, wherein for each of the plurality of currency exchange transactions the set of data objects specify:

two data sources as a party and a counterparty;

a type that indicates a base currency and counter currency;

transaction size; and a transaction polarity;

obtain constraint data based on configuration files for each data object;

identify a subset of data objects from among the set of data objects associated with a particular data source from among those specified within the plurality of data objects;

automatically trigger and execute, responsive to determining that the set of data objects exceeds a data size threshold, an optimization procedure to determine a set of adjustments to the subset of data objects, the optimization procedure including:

determining an offset that increases, based on the constraint data, an aggregate magnitude of the subset of data objects by increasing a net position size of a subset of the plurality of currency exchange transactions represented by the subset of data objects; and determining, based on the constraint data from the subset of data objects, at least one data object to remove from the subset of data objects;

compress, the subset of data objects by executing the determined set of adjustments on the subset of data objects by removing the at least one data object and adding the offset to obtain a compressed subset of data objects; and store, in memory, the compressed set of data objects with the offset in accord with the set of adjustments and without the at least one data object of the subset of data objects, wherein compressing the subset of data objects by removing the at least one data object reduces a total bilateral risk for all parties and all counterparties in the subset of the plurality of currency exchange transactions but is risk neutral for the particular source, the reduction in total bilateral risk being at least at large as the increase to the net position size thereby also reducing a data link magnitude at least as much as the aggregate magnitude is increased without information loss.

11. The non-transitory machine-readable media of claim 10, wherein the subset of data objects includes at least a pair of data objects matching in type and transaction size and having opposite polarity.

12. The non-transitory machine-readable media of claim 10, wherein the instructions are further configured to cause the processor to execute the optimization procedure via a linear optimizer initialized using the constraint data.

13. The non-transitory machine-readable media of claim 10, wherein the constraint data includes tolerance data indicative of a limitation on an extent to which the optimization procedure is permitted to consider adjustments that result in deviation in a net size of data objects of any single data source from among the data sources.

14. The non-transitory machine-readable media of claim 13, wherein the net size is specific to the data object type.

15. The non-transitory machine-readable media of claim 13, wherein the tolerance data is specified as a function of time.

16. The non-transitory machine-readable media of claim 10, wherein the instructions are further configured to cause the processor to:

reduce via the optimization procedure by adding a new data object to the set of data objects in connection with determining the set of adjustments; and incorporate the new data object into the set of data objects.

17. The non-transitory machine-readable media of claim 10, wherein the constraint data comprises data link composite magnitudes for each data source of the plurality of data sources.

18. The non-transitory machine-readable media of claim 10, wherein at least one data object of the set of data objects identifies a bilateral link between at least the two data sources associated with that data object.

19. A system for data compression including:

means for obtaining a set of data objects for a plurality of currency exchange transactions, wherein for each of the plurality of currency exchange transactions the set of data objects specify:

two data sources as a party and a counterparty;

a type that indicates a base currency and counter currency;

transaction size; and a transaction polarity;

means for obtaining constraint data based on configuration files for each data object;

means for identifying a subset of data objects from among the set of data objects with associated with a particular data source from among those specified within the plurality data objects; and means for automatically triggering and executing, responsive to determining that the set of data objects exceeds a data size threshold, an optimization procedure to determine a set of adjustments to the subset of data objects, the optimization procedure including:

determining an offset that increases, based on the constraint data, an aggregate magnitude of the subset of data objects by increasing a net position size of a subset of the plurality of currency exchange transactions represented by the subset of data objects; and determining, based on the constraint data for the subset of data objects, at least one data object to remove from the subset of data objects;

means for compressing, the subset of data objects by executing the determined set of adjustments on the subset of data objects by removing the at least one data object and adding the offset to obtain a compressed subset of data objects; and means for storing the compressed subset of data objects with the offset in accord with the set of adjustments and without the at least one data object of the subset of data objects, wherein compressing the subset of data objects by removing the at least one data object reduces a total bilateral risk for all parties and all counterparties in the subset of the plurality of currency exchange transactions but is risk neutral for the particular source, the reduction in total bilateral risk being at least at large as the increase to the net position size thereby also reducing a data link magnitude at least as much as the aggregate magnitude is increased without information loss.

20. The system of claim 19, wherein the subset of data objects includes at least a pair of data objects matching in type and transaction size and having opposite polarity.

* * * * *